US011884081B2

(12) United States Patent
Marsh et al.

(10) Patent No.: US 11,884,081 B2
(45) Date of Patent: Jan. 30, 2024

(54) THERMAL PROCESSING DRUM AND METHODS

(71) Applicant: CARESTREAM HEALTH, INC., Rochester, NY (US)

(72) Inventors: Joel C. Marsh, New Richmond, WI (US); Bradley R. Sahr, Lake Elmo, MN (US); Kent R. Struble, Woodbury, MN (US)

(73) Assignee: Carestream Health, Inc., Rochester, NY (US)

( * ) Notice: Subject to any disclaimer, the term of this patent is extended or adjusted under 35 U.S.C. 154(b) by 295 days.

(21) Appl. No.: 17/611,303

(22) PCT Filed: Apr. 17, 2020

(86) PCT No.: PCT/US2020/028609
§ 371 (c)(1),
(2) Date: Nov. 15, 2021

(87) PCT Pub. No.: WO2020/247076
PCT Pub. Date: Dec. 10, 2020

(65) Prior Publication Data

US 2022/0234362 A1 Jul. 28, 2022

Related U.S. Application Data

(60) Provisional application No. 62/856,298, filed on Jun. 3, 2019.

(51) Int. Cl.
*B41J 2/335* (2006.01)
*B41M 5/26* (2006.01)
*B41J 11/00* (2006.01)

(52) U.S. Cl.
CPC ............ *B41J 2/335* (2013.01); *B41J 11/0015* (2013.01); *B41M 5/26* (2013.01)

(58) Field of Classification Search
CPC ......... B41J 2/335; B41J 11/0015; B41M 5/26
See application file for complete search history.

(56) References Cited

U.S. PATENT DOCUMENTS 7,317,468 B2 1/2008 Struble et al.
9,195,185 B1 11/2015 Struble et al.
(Continued)

FOREIGN PATENT DOCUMENTS

JP 2002-110316 4/2002
WO 2019-126143 6/2019

OTHER PUBLICATIONS

International Search Report for International Application No. PCT/US2020/028609 dated Jul. 7, 2020, 2 pages.
(Continued)

*Primary Examiner* — Justin Seo

(57) ABSTRACT

A drum (10) and thermal control system (180) in this disclosure are suitable for use in systems for thermally processing imaging media. The drum comprises a cylindrical surface (11) disposed around and parallel to an axis of rotation (A) of the drum, end plates (12) each extending orthogonally to the axis of rotation of the drum, and lamp heaters (14A-14B) extending parallel to the axis of rotation within the interior of the drum. By making use of thermal sensor measurements, the lamp heaters may be controlled to maintain a uniform dmm surface temperature.

20 Claims, 4 Drawing Sheets

(56) References Cited

U.S. PATENT DOCUMENTS

| | | | | |
|---|---|---|---|---|
| 9,958,815 | B2 * | 5/2018 | Kikegawa .......... | G03G 15/2039 |
| 2006/0289418 | A1 | 12/2006 | Konishi et al. | |
| 2009/0196643 | A1 | 8/2009 | Mito et al. | |
| 2017/0017182 | A1 | 1/2017 | Saito et al. | |

OTHER PUBLICATIONS

Commonly assigned PCT Application No. PCT/US18/66194, entitled: Thermal Processing Drum filed on Dec. 18, 2018, by Struble et al.

* cited by examiner

THERMAL PROCESSING DRUM AND METHODS

CROSS REFERENCE TO RELATED APPLICATIONS

This application claims the benefit of and is a U.S. National Phase filing of PCT Application PCT/US2020/028609 filed Apr. 17, 2020 entitled "THERMAL PROCESSING DRUM AND METHODS", in the name of Marsh et al., which claims benefit of U.S. patent Application Ser. No. 62/856,298, filed Jun. 3, 2019 entitled "THERMAL PROCESSING DRUM AND METHODS" in the name of Marsh et al.

SUMMARY

At least a first embodiment provides a drum for processing a thermal image medium, the drum comprising a cylindrical surface disposed around and parallel to an axis of rotation of the drum; first and second end plates each extending orthogonally to the axis of rotation and, with the cylindrical surface, defining an inner core of the drum; a first lamp heater extending parallel to the axis of rotation, the first lamp heater comprising within the inner core a first left heating segment, a first right heating segment, and a first center heating segment disposed between the first left heating segment and first right heating segment; and a second lamp heater extending parallel to the axis of rotation, the second lamp heater comprising within the inner core a second left heating segment, a second right heating segment, and a second center heating segment disposed between the second left heating segment and second right heating segment; where the first center heating segment, the second left heating segment, and the second right heating segment are not energizable for heating; the first left heating segment and first right heating segment are configured to be simultaneously energizable for heating; and the second center heating segment is energizable for heating.

In at least some embodiments, the first lamp heater comprises no segments external to the inner core that are energizable for heating; the second lamp heater comprises no segments external to the inner core that are energizable for heating; or both.

In at least some embodiments, the drum further comprises at least one temperature sensor in thermal communication with the cylindrical surface. In at least some cases, the at least one temperature sensor is disposed within the inner core. In at least some cases there is only a single temperature sensor.

At least a second embodiment comprises a method of controlling the drum according to the previous embodiments, the method comprising obtaining a temperature measurement from the single temperature sensor. Some such methods further comprise energizing the first left heating segment and first right heating segment for heating, preferably after obtaining the temperature measurement. In some cases, the methods further comprise energizing the second center heating segment for heating, preferably after energizing the first left heating segment and the first right heating segment. Such methods may further comprise deenergizing the second center heating segment, preferably after energizing the second center heating segment.

These embodiments and other variations and modifications may be better understood from the brief description of the drawings, drawings, description, claims that follow.

DESCRIPTION

All publications, patents, and patent documents referred to in this document are incorporated by reference herein in their entirety, as though individually incorporated by reference.

U.S. Provisional Application No. 62/856,298, filed Jun. 3, 2019, entitled THERMAL PROCESSING DRUM AND METHODS, is hereby incorporated by reference in its entirety.

Photothermographic film and thermal processing of such films are, for example, described in U.S. Pat. Nos. 9,195,185 and 7,317,468, and PCT Patent Application No. PCT/US18/66194, filed Dec. 18, 2018, entitled "THERMAL PROCESSING DRUM," each of which is incorporated by reference in its entirety.

As used herein, the term "energizable" relates to a device or set of components that perform an indicated function upon receiving power and, optionally, upon receiving an enabling signal.

Introduction

Photothermographic film typically includes a thin base material, such as a polymer, which is coated on at least one side with an emulsion of photosensitive and heat sensitive materials. After the film has been subjected to photo stimulation to form a latent image in the emulsion, such as, for example, via a laser imager, a thermal processor is employed to develop an image from the latent image through application of heat to the film. Typically, a thermal processor raises the base material and emulsion to an optimal development temperature at which a chemical reaction of the emulsion occurs at an optimal rate. The thermal processor then maintains the film at the optimal development temperature for a required development duration to develop the image from the latent image.

Drum

One type of thermal processor is a drum processor. Drum processors typically employ a rotating heated drum having a series of rollers positioned about a segment of the drum's surface. Such rollers are sometimes referred to as "pressure rollers" and are biased against the drum. During development, rotation of the drum draws the photothermographic film between the pressure rollers and the drum, with the pressure rollers holding the photographic film against the drum so that heat is efficiently and evenly transferred from the drum to the photothermographic film.

The rotating drum's surface is preferably cylindrical and is typically a right circular cylinder having a central axis perpendicular to the ends plates of the drum. The central axis is generally coincident with the axis of rotation of the drum.

Lamp Heaters

One means of heating a drum is the use of one or more lamp heaters, such as, for example, infrared lamp heaters. Such lamp heaters are described in U.S. Patent Publication No. 2006/0289418, which is hereby incorporated by reference in its entirety. In the context of this disclosure, the terms “lamp heater,” “heater lamp,” “lamp,” or “heater” may be used interchangeably, unless otherwise specified.

Figure 1:
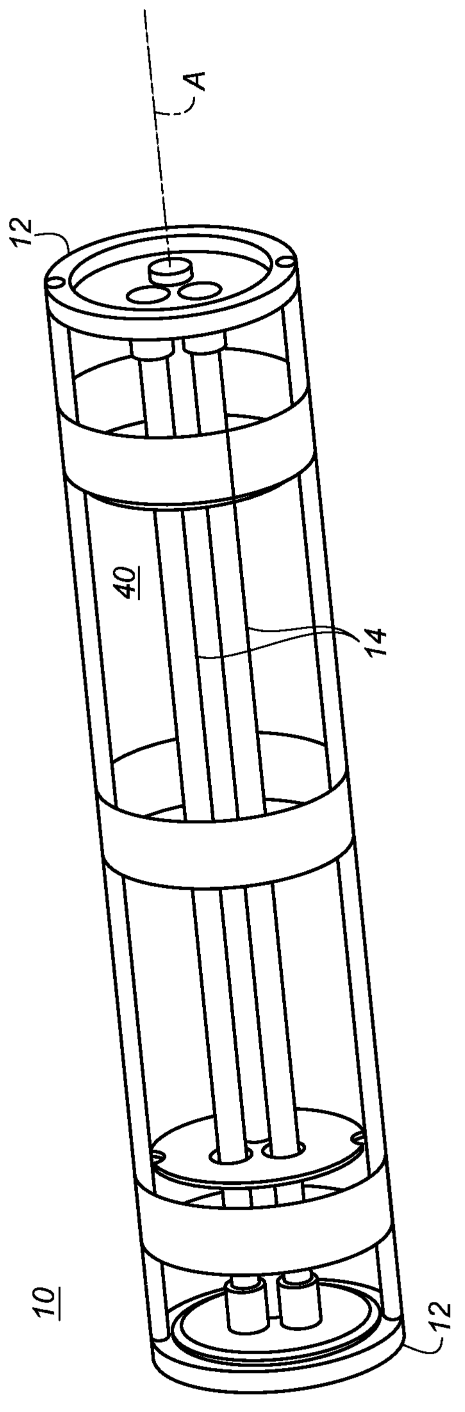
FIG. 1 shows a drum according to the present disclosure having two lamp heaters.

Referring to FIG. 1, interior components of a cylindrical drum 10 are shown. The outer surface of drum 10 is removed to allow visibility of heater components. Drum 10 of the present disclosure employs a number of lamps as heaters; the heater lamps are in the form of glass tubes 14 that provide the lamp heaters and that extend, substantially the full length of the drum 10, in parallel to a drum axis of rotation A. This arrangement, with lamp heating filaments spaced apart from the drum 10 surface, helps to keep the lamp wiring away from the radiant heat area against the drum surface. Drum 10 has an inner core 40 between two end plates 12 that each extend along planes perpendicular to axis A.

Lamp heaters 14 may contain a number of filament segments, each of which may be individually energized for heating. Such filament segments may or may not extend the full length of the lamp heaters. In some cases, while the lamp heaters may extend beyond the two end plate 12, the filament segments of one or more of the lamp heaters may be contained only within the inner core 40. Such lamp heaters may also be individually deenergized, resulting in the cooling of the lamp heaters.

Figure 2:
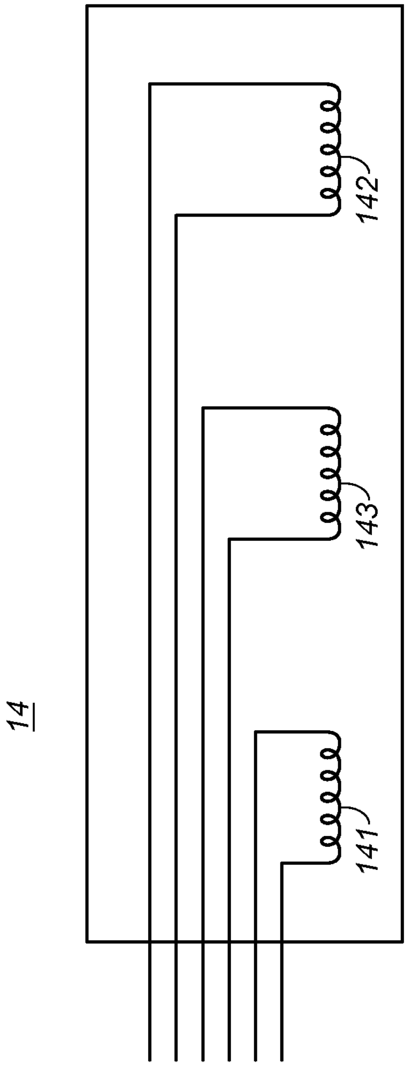
FIG. 2 shows a lamp heater having three filament segments.

Referring to FIG. 2, the filament segments of lamp heaters 14 may, for example, consist of a left filament segment 141, a right filament segment 142, and a center filament segment 143 disposed between the left and right filament segments. The left filament segment 141, right filament segment 142, and center filament segment 143 may be of equal lengths or may be of differing lengths. In some cases, a filament segment may not contain a filament at all.

Figure 3:
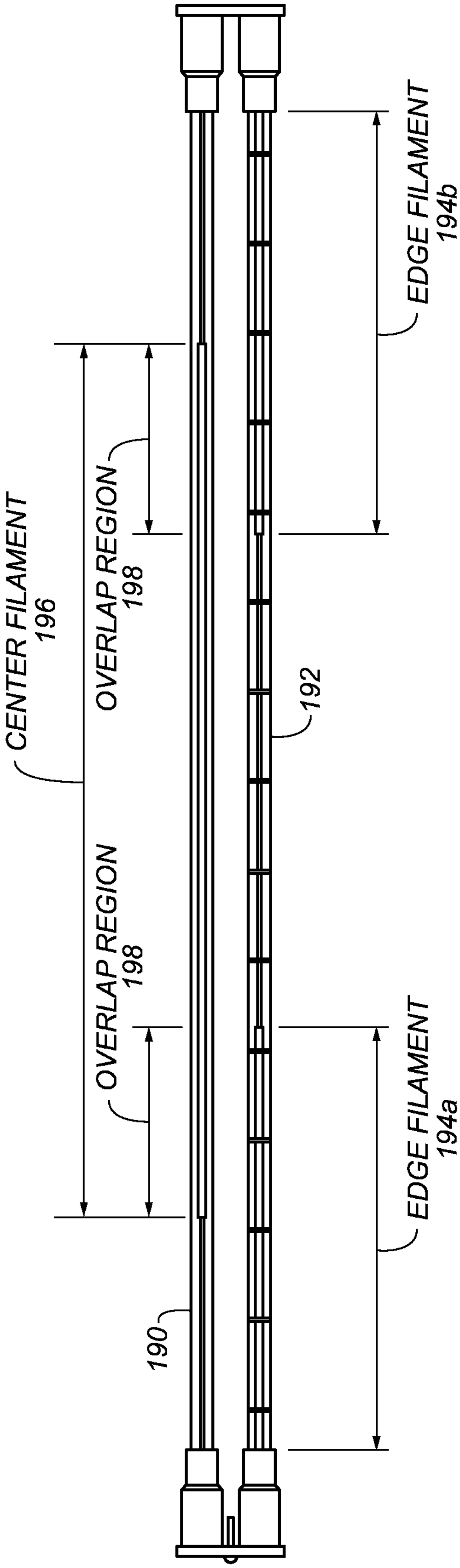
FIG. 3 shows a pair of lamp heaters, the first having a center filament segment, the second having a left filament segment and a right filament segment.

FIG. 3 shows a pair of lamp heaters 190 and 192. Lamp heater 190 has a center filament segment 196; its left and right filament segments (not numbered) contain no filaments at all Lamp heater 192 has a left filament segment 194*a* and a right filament segment 194*b*; its center filament segment (not numbered) does not contain a filament. Note that in this case, the center filament segment 196 of lamp heater 190 overlaps 198 with the left and right filament segments 194*a*, 194*b* of lamp heater 192.

Thermal Control System

Figure 4:
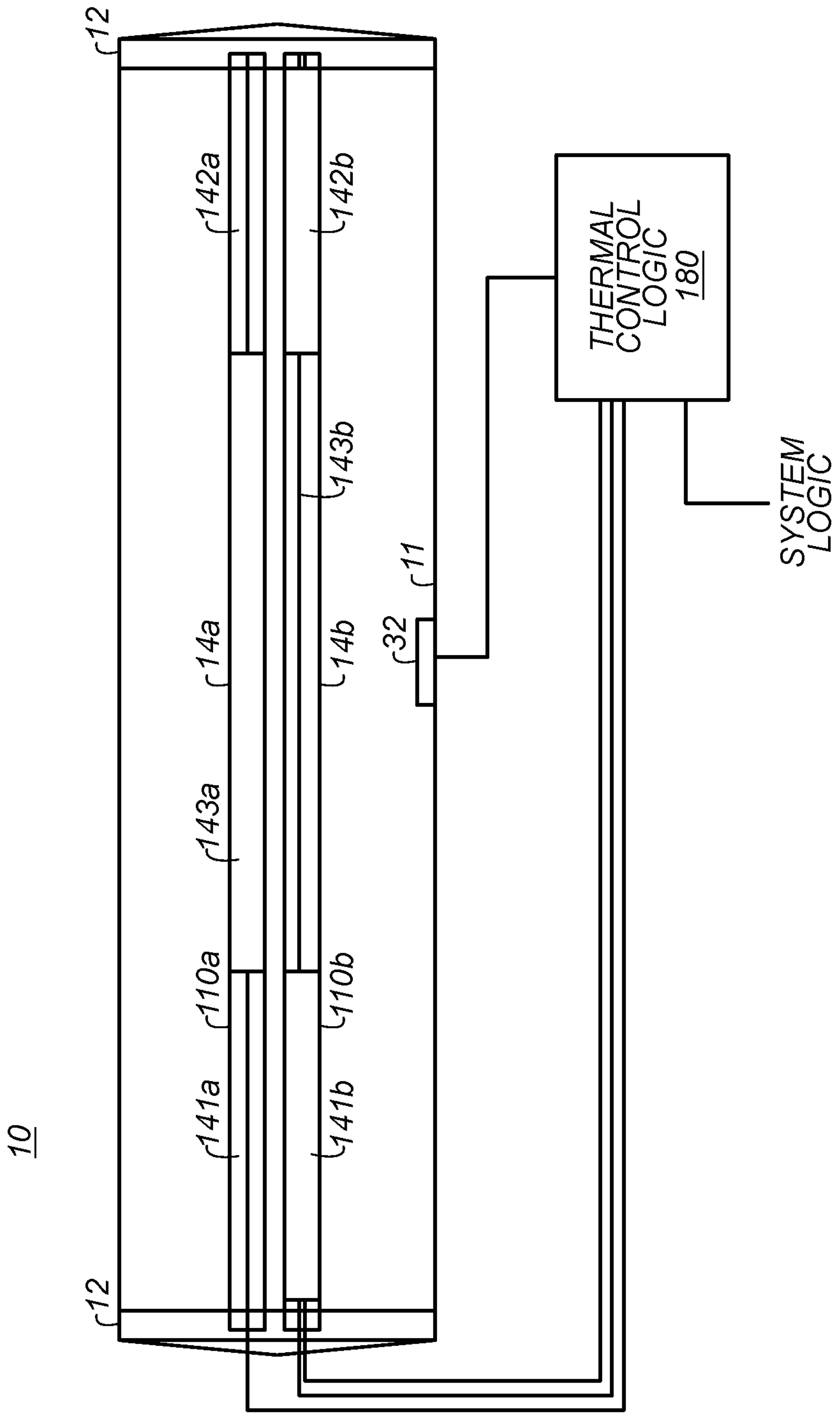
FIG. 4 shows a schematic diagram depicting the function of a thermal control logic processor that controls the energization of the lamp heaters.

FIG. 4 shows a schematic diagram depicting the function of a thermal control logic processor 180 that controls the energization of the lamp heaters 14*a* and 14*b* according to an embodiment of the present disclosure. Left filament segments 141*a* and 141*b* are shown. Right filament segments 142*a* and 142*b* are shown. Center filament segments 143*a* and 143*b* are shown. A thermal sensor 32 is also shown, in thermal communication with drum surface 11.

Thermal control logic processor 180 can be a separate, dedicated control processor, or may have its functions executed by system control logic for the overall imaging system. In either case, control logic processor 180 is in signal communication with imaging system logic for instructions to control drum surface 11 temperature.

Continuing with FIG. 4, drum surface 11 temperature is monitored by a sensor 32. Based on sensor 32 feedback and, optionally, on control signals from system logic, control logic processor 180 selectively energizes filament segments in one or more of the heating lamps 110*a* and 110*b*. Zero, one, two, or three segments in each heating lamp may be energized; three, two, one, or zero segments in each heating lamp may be deenergized. The voltage across and current flowing through each individual heating segment may also be varied to change the heat supplied.

In a particularly advantageous embodiment, two heating lamps 14*a* and 14*b* are employed, where left heating segment 141*a* and right heating segment 142*a* are simultaneously energized, with center segment 143*a* remaining deenergized. In some such cases, the center heating segment 143*b* is also energized, with left heating segment 141*b* and right heating segment 142*b* remaining deenergized.

Temperature Control for Thermal Processing Operations

The drum and thermal control system in this disclosure are suitable for use in systems for thermally processing (“printing”) an imaging material, such as those disclosed in U.S. Pat. Nos. 9,195,185 and 7,317,468, and PCT Patent Application No. PCT/US18/66194, filed Dec. 18, 2018, entitled “THERMAL PROCESSING DRUM,” each of which is incorporated by reference in its entirety.

In such systems, it is possible to use measurements from the single thermal sensor 32, along with a set of system inputs, to control the lamp heater segments to maintain uniform drum surface 11 temperature. This allows consistent processing of the thermal media, as might be required in such fields as diagnostic medical imaging. For example, the following set of system inputs might be used:

1. the length of time since the last film was printed,
2. the size of the film being printed, and
3. the number of consecutive films that have been printed since the printer was last idle.

For example, the following example method might be used to vary the heat input to the left and right filament segments of a first lamp heater, and to the center filament segment of a second lamp heater, with the remaining filament segments remaining deenergized.

If the length of time since the last film was printed is greater than, for example, 2.5 minutes, the printer is considered idle. If the printer is idle, the first lamp heater left and right filament segments voltages or currents are varied to maintain a constant drum surface temperature, as indicated by thermal sensor measurements. The center filament segment of the second lamp heater remains deenergized.

If the length of time since the last film was printed is less than, for example, 2.5 minutes, a counter is maintained of the number of successive films being printed since the printer was last idle. Because of the loss of heat to each film, the heat output of the filament segments is increased with the number of successive films being printed, with the center filament segment of the second lamp heater being energized to make up for heat losses from the drum surface to the center of the film during printing. Note that the size of the film being printed will affect the heat loss per film, so the film size may be taken into account in determining the heat input requirements of the filament segments.

Center to edge variation of the drum surface temperature may be minimized by dividing the heat input to the drum between the left and right heating segments of the first lamp heater and that to the center heating segment of the second lamp heater according to the expected heat losses from the center and edge of the drum to each successive printed film.

After one or more successive films have finished printing, voltage or current to the filament segments is decreased over time, in order to maintain a constant drum surface temperature. After, in this example, 2.5 minutes, the printer state is then idle, returning the temperature control method to that described at the start of this example, with the center filter segment of the second control lamp having become deenergized.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:

1. A drum for processing a thermal image medium, the drum comprising:

a cylindrical surface disposed around and parallel to an axis of rotation of the drum;

first and second end plates each extending orthogonally to the axis of rotation and, with the cylindrical surface, defining an inner core of the drum;

a first lamp heater extending parallel to the axis of rotation, the first lamp heater comprising within the inner core a first left heating segment, a first right heating segment, and a first center heating segment disposed between the first left heating segment and first right heating segment;

a second lamp heater extending parallel to the axis of rotation, the second lamp heater comprising within the inner core a second left heating segment, a second right heating segment, and a second center heating segment disposed between the second left heating segment and second right heating segment; and at least one temperature sensor in thermal communication with the cylindrical surface;

wherein the at least one temperature sensor is disposed within the inner core;

the first center heating segment, the second left heating segment, and the second right heating segment are not energizable for heating;

the first left heating segment and first right heating segment are configured to be simultaneously energizable for heating; and wherein the second center heating segment is energizable for heating.

2. The drum according to claim 1, wherein the first lamp heater comprises no segments external to the inner core that are energizable for heating.

3. The drum according to claim 1, wherein the second lamp heater comprises no segments external to the inner core that are energizable for heating.

4. The drum according to claim 1, wherein the at least one temperature sensor consists of a single temperature sensor.

5. A method of controlling the drum according to claim 4, the method comprising obtaining a temperature measurement from the single temperature sensor.

6. The method according to claim 5, further comprising energizing the first left heating segment and the first right heating segment for heating.

7. The method according to claim 6, wherein the energizing of the first left heating segment and the first right heating segment occurs after obtaining the temperature measurement.

8. The method according to claim 6, further comprising energizing the second center heating segment for heating.

9. The method according to claim 8, wherein the energizing of the second center heating segment occurs after the energizing of the first left heating segment and the first right heating segment.

10. The method according to claim 8, further comprising deenergizing the second center heating segment.

11. The method according to claim 10, wherein the deenergizing of the second center heating segment occurs after the energizing of the second center heating segment.

12. A drum for processing a thermal image medium, the drum comprising:

a cylindrical surface disposed around and parallel to an axis of rotation of the drum;

first and second end plates each extending orthogonally to the axis of rotation and, with the cylindrical surface, defining an inner core of the drum;

a first lamp heater extending parallel to the axis of rotation, the first lamp heater comprising within the inner core a first left heating segment, a first right heating segment, and a first center heating segment disposed between the first left heating segment and first right heating segment;

a second lamp heater extending parallel to the axis of rotation, the second lamp heater comprising within the inner core a second left heating segment, a second right heating segment, and a second center heating segment disposed between the second left heating segment and second right heating segment; and at least one temperature sensor in thermal communication with the cylindrical surface;

wherein the at least one temperature sensor consists of a single temperature sensor;

the first center heating segment, the second left heating segment, and the second right heating segment are not energizable for heating;

the first left heating segment and first right heating segment are configured to be simultaneously energizable for heating; and wherein the second center heating segment is energizable for heating.

13. The drum according to claim 12, wherein the first lamp heater comprises no segments external to the inner core that are energizable for heating.

14. The drum according to claim 12, wherein the second lamp heater comprises no segments external to the inner core that are energizable for heating.

15. A method of controlling the drum according to claim 12, the method comprising obtaining a temperature measurement from the single temperature sensor.

16. The method according to claim 15, further comprising energizing the first left heating segment and the first right heating segment for heating.

17. The method according to claim 16, wherein the energizing of the first left heating segment and the first right heating segment occurs after obtaining the temperature measurement.

18. The method according to claim 16, further comprising energizing the second center heating segment for heating.

19. The method according to claim 18, wherein the energizing of the second center heating segment occurs after the energizing of the first left heating segment and the first right heating segment.

20. The method according to claim 18, further comprising deenergizing the second center heating segment.

* * * * *